United States Patent [19]

Smith

[11] Patent Number: 5,270,706

[45] Date of Patent: Dec. 14, 1993

[54] PASSIVE AIRCRAFT PROXIMITY DETECTOR FOR USE IN HIGHWAY VEHICLES

[76] Inventor: Dale T. Smith, 604 Clarendon Ct., Troy, Ohio 45373

[21] Appl. No.: 730,198

[22] Filed: Jul. 15, 1991

Related U.S. Application Data

[63] Continuation of Ser. No. 309,318, Feb. 10, 1989, abandoned.

[51] Int. Cl.$^5$ .................................. G08G 1/00
[52] U.S. Cl. .................................. 340/902; 340/903; 340/901; 342/20; 455/227
[58] Field of Search ............... 340/901, 945, 902, 903; 455/226, 227; 342/20, 30, 29

[56] References Cited

U.S. PATENT DOCUMENTS

| | | | |
|---|---|---|---|
| 4,161,729 | 7/1979 | Schneider | 342/32 |
| 4,167,006 | 9/1979 | Fanatsa et al. | 342/32 |
| 4,384,290 | 5/1983 | Pierrot et al. | 342/43 |
| 4,581,769 | 4/1986 | Grimsley et al. | 455/226 |
| 4,626,857 | 12/1986 | Imazeki | 455/226 |
| 4,709,407 | 11/1987 | Baba | 455/226 |
| 4,750,215 | 6/1988 | Biggs | 455/226 |
| 4,906,999 | 3/1990 | Harrah et al. | 342/20 |

OTHER PUBLICATIONS

Escort ® Advertisement; Car and Driver, Sep. 1988.

Primary Examiner—Jin F. Ng
Assistant Examiner—Jeffery A. Hofsass
Attorney, Agent, or Firm—Porter, Wright, Morris & Arthur

[57] ABSTRACT

A passive aircraft proximity detector for use in highway vehicles. This invention includes a unique internal antenna (1) feeding a superheterodyne receiver (2). A novel reference system (3) provides phase synchronous local oscillator injection. A signal analysis system (4) determines the presence of a valid signal and activates a tracking indicator (5). The analysis system also provides range data to an indicator which displays the approximate range of the aircraft (6). A mutable timed audio alarm is also incorporated (7).

30 Claims, 4 Drawing Sheets

PASSIVE AIRCRAFT PROXIMITY DETECTOR FOR USE IN HIGHWAY VEHICLES

This is a continuation of U.S. patent application Ser. No. 07/309,318, filed Feb. 10, 1989, now abandoned.

FIELD OF THE INVENTION

This invention relates to receivers, and more particularly to a receiver which is uniquely designed to detect aircraft in close proximity to warn the user thereof, and to indicate the approximate range of the aircraft. The invention provides the average motorist with convenient protection against the depredations of aircraft surveillance at nominal cost. Such protection has heretofore been unavailable at any cost.

BACKGROUND AND SUMMARY OF THE INVENTION

Propeller driven and rotor wing aircraft moving through the atmosphere generate radio frequency emissions of various frequencies and intensities. Of these emissions, those in the 1000 MHz region appear to be the most consistent and are utilized by this invention. The use of this high frequency band in a detector also results in small circuit elements and a correspondingly miniature overall assembly.

It is thus an object of the invention to provide a useful, compact passive aircraft proximity detector for use in a highway vehicle, by which high frequency emissions in the 1000 MHz region radiated by surveillance aircraft can be detected and an appropriate signal of aircraft proximity can be generated to inform the vehicle operator of such aircraft.

Further objects of the invention are to provide such a detector operating within the frequency range of 900 to 1300 megahertz for use in highway vehicles. In addition, it is an object of the detector to incorporate an internal antenna within the detector itself and to provide further means of indicating that an aircraft has been detected.

A further object is to provide an aircraft proximity detector with an ability to determine and read out the approximate range of aircraft and to provide an audio alarm that is activated when an aircraft is within range. As an element of this object the detector may incorporate means to deactivate the audio alarm.

Similarly, it is an object also to provide an aircraft proximity detector having a user adjustable detection range.

The aircraft proximity detector is preferably powered by 12 volts DC, conventional to highway vehicles, and incorporates a power indicator, a means of turning the power on and off, and is formed in a microstrip structure, that incorporates a harmonically related local oscillator system.

These and further objects are evident from the following description taken in conjunction with the drawings in which:

DESCRIPTION OF THE PREFERRED EMBODIMENT

The passive aircraft proximity detector preferably combines a receiving antenna and circuit board components in a single component case unit that can be conveniently mounted in or on a highway vehicle at an appropriate location.

Figure 2:
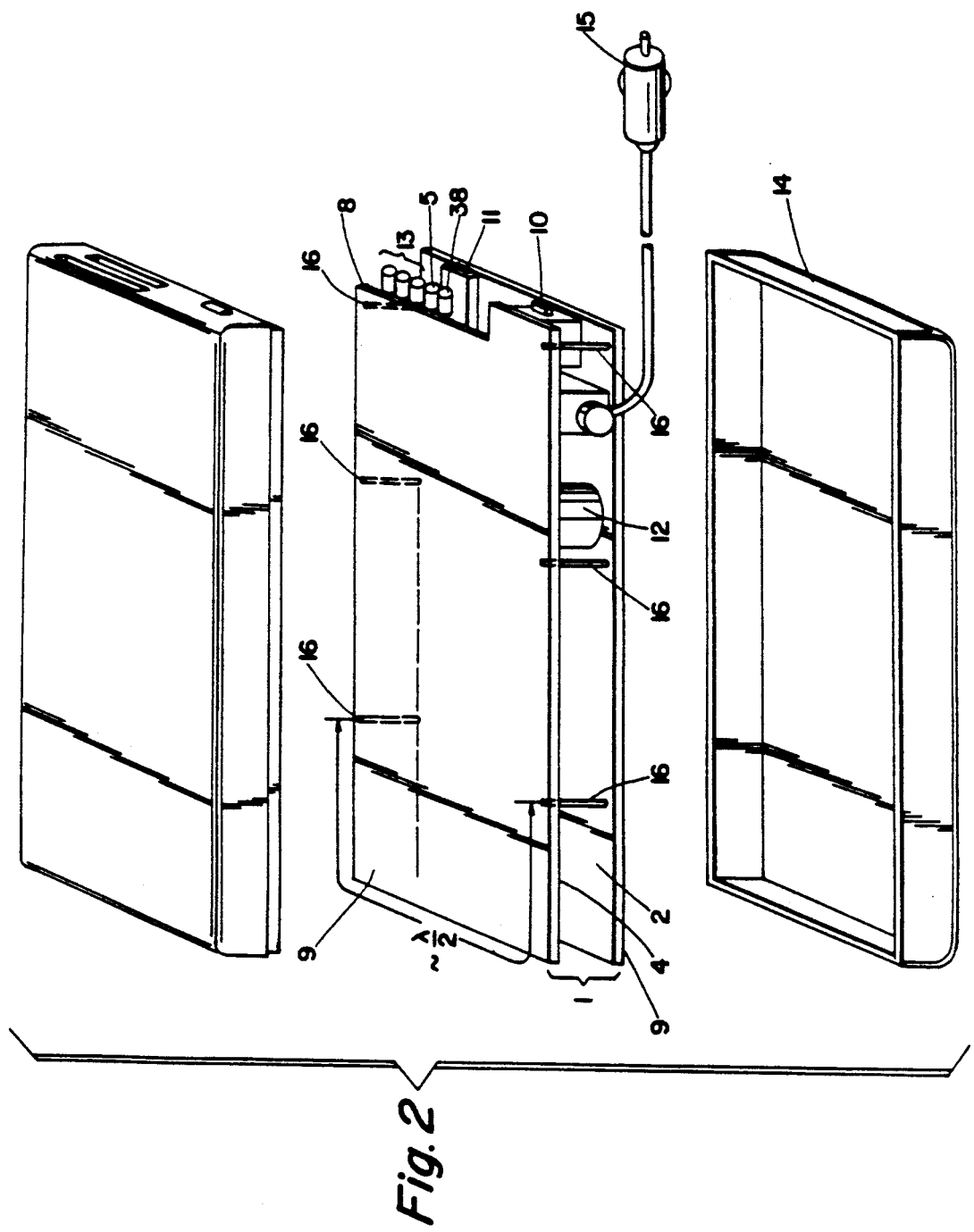
FIG. 2 shows the relationship of the intrinsic antenna plates and circuit board with respect to the case enclosing the detector.

With reference to FIG. 2, there is disclosed a novel antenna (1) which is an integral part of the circuit board assembly (8). The ground planes of the two printed circuit boards are combined to form an omnidirectional antenna (1).

A superheterodyne receiver for the approximate frequency range of 900 to 1300 megahertz is surface mounted to the inside surface of one of the printed circuit boards (2) and a signal processor to the other (4). Control functions are provided by a power switch (10) and a manual sensitivity control designed as a potentiometer (11). Audio output is produced by an audio transducer system (12) and visual data is displayed by light emitting diodes (13). The entire assembly is contained in a non-conducting housing (14) and provided with power via a cigarette lighter plug (15) that is connected to a standard motor vehicle 12 volt DC electrical system.

As shown in FIG. 2, the antenna may consist of two parallel conducting plates, such as the outside surfaces of two printed circuit boards. The two plates are connected by shorting bars located at specific points around their periphery (16). The antenna thus created combines the desirable characteristics of wave guide, modified slot, and transmission line radiator antennae. Maintaining the critical dimensions of the plates on the order of one-half wavelength of the frequency range of interest results in a small, self-contained antenna with excellent out-of-band rejection and a 360° pattern, which are both objects of the present invention.

Figure 1:
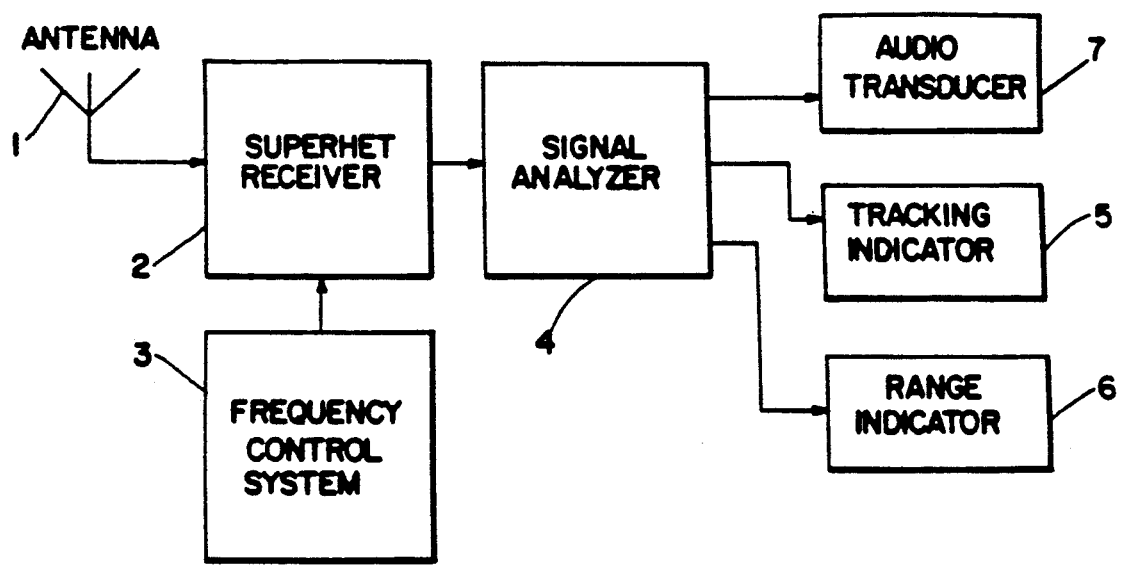
FIG. 1 is a block diagram of the principal circuit component of the aircraft proximity detector.
Figure 4:
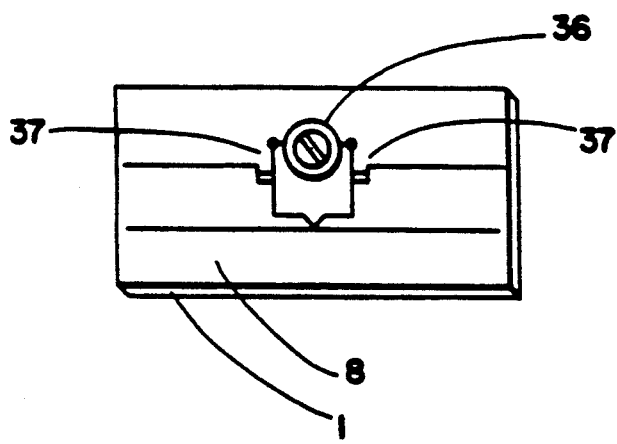
FIG. 4 shows a microstrip structure incorporating a tuning capacitor.
Figure 3:
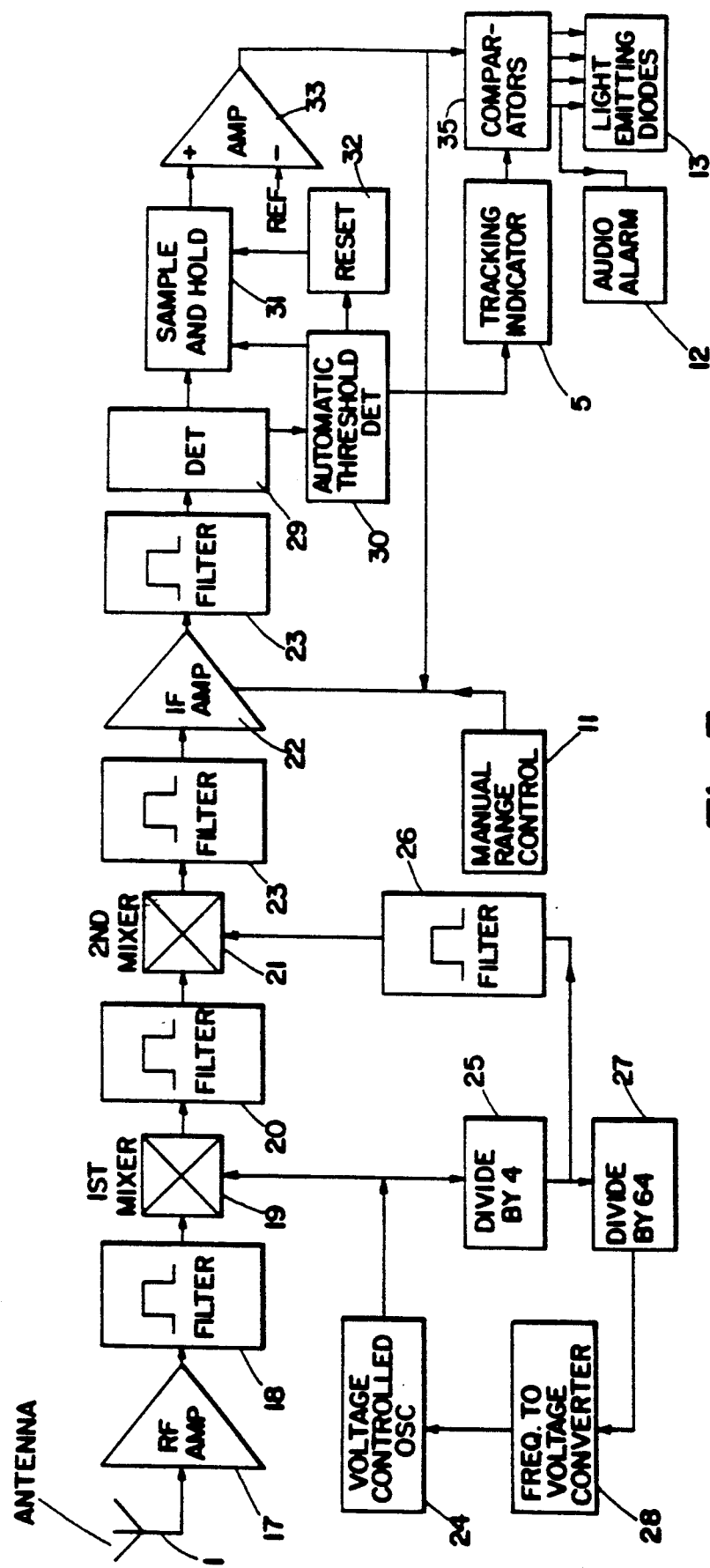
FIG. 3 shows a detailed diagram of the signal processing steps of the circuits of the detector.

Referring to FIG. 3, the signal appearing at the antenna is fed to a radio frequency amplifier (17) which provides gain and impedance matching to a filter (18). This filter is a microstrip structure, shown in FIG. 4, which functions as a band pass filter at signal frequencies, and a band stop filter at image frequencies. The filter is tuned by capacitor (36). The filter has additional advantages in that the input and output impedances are independently determined by the position of surface mounted capacitors (37). The signal thus derived is fed to a conventional double conversion system consisting of a first mixer (19), a band pass filter (20), a second mixer (21), and an intermediate frequency amplifier having voltage controlled gain (22). The intermediate frequency amplifier is equipped with input and output filters (23).

Figure 5:
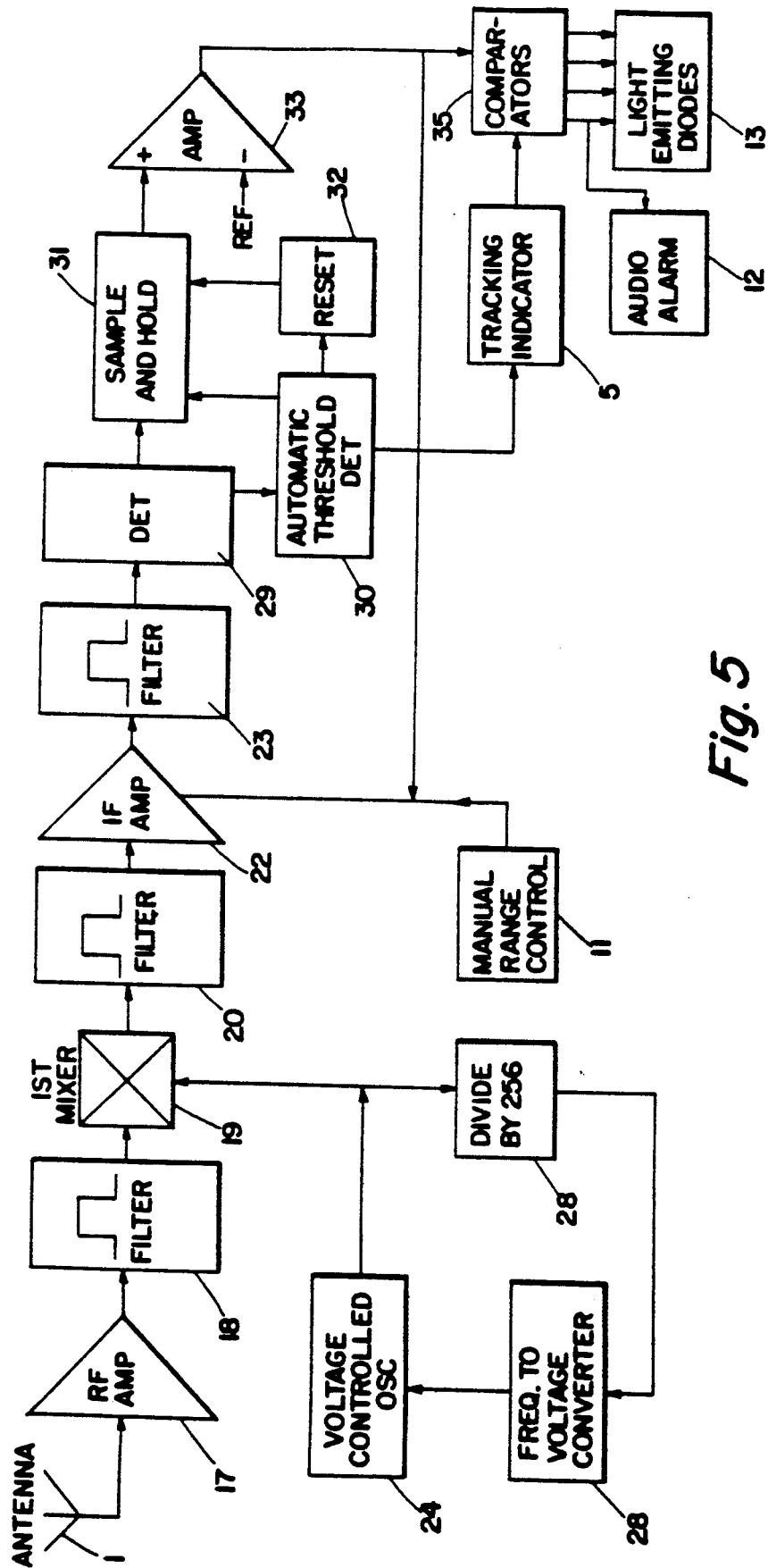
FIG. 5 shows an alternate signal processing sequence.

A single conversion system which is delineated in FIG. 5 for reference is also an alternate circuit useful in the present invention.

Local oscillator injection is provided to the first mixer (19) by a voltage controlled oscillator (24). The voltage controlled oscillator is also divided by divider (25) and fed via a filter (26) to the second mixer (21). The voltage controlled oscillator (24) is controlled by a stabilization system consisting of a second divider (27) and a frequency-to-voltage converter (28).

The filtered output of the intermediate frequency amplifier (22) is amplitude detected by detector (29). Each time the amplitude of the signal exceeds a predetermined level, a pulse is output by threshold detector (30). This pulse trips a tracking indicator (5) which visually informs the user that an aircraft is being tracked. The tracking indicator allows the user to determine that the unit is working properly, and facilitates adjustment of the manual sensitivity control (11).

Pulses generated by the threshold detector (30) also strobe a sample and hold circuit (31) which stores the amplitude of the signal. The sample and hold circuit is reset by reset circuit (32) if no strobes occur within a period of time.

The output of the sample and hold circuit (31) is fed to a differential amplifier (33), the output of which is fed to the gain control input of the intermediate frequency amplifier (22). If the hold output exceeds a predetermined reference level, the differential amplifier (33) output reduces the gain of the intermediate frequency amplifier (22) so that the output of the intermediate frequency amplifier (22) is very close to the reference level of the differential amplifier (33). Thus, the output of the differential amplifier (33) is directly reasked to the amplitude of the incoming signal and inversely related to the range of its source. Since the gain reduction system tends to suppress weaker signals, only the strongest signal is processed. This output is directed to a voltage sensitive readout consisting of comparators (35) driving light emitting diodes (13). The readout is disabled by the tracking indicator in the absence of a signal.

The output of the first comparator (35) is also fed to an audio transducer system (12) which emits a short audible alarm each time the first comparator is tripped, i.e., whenever an aircraft comes within range. The audio alarm can be disabled by function switch (10) if so desired.

The detector is powered by 12 volts DC via a cigarette lighter plug (15) and power switch (10). A power indicator (38) illuminates when power is applied.

Having described the invention, what is claimed is:

1. An aircraft proximity detector for use in a history vehicle, comprising:
   a circuit board assembly, said assembly comprising two printed circuit boards, the first of said printed circuit boards having a receiver secured to an inside surface thereof and the second of said printed circuit boards having signal processor means secured to an inside surface thereof, said signal processor means comprising a frequency amplitude detector for passively detecting existing frequency emissions from aircraft flying in the vicinity of said vehicle and received by said receiver;
   means for electrically connecting said assembly to a power source of said vehicle;
   an antenna associated with said circuit board assembly; and
   means for alerting an occupant of said vehicle that an aircraft has been detected based on an amplitude of said frequency emissions.

2. The detector of claim 7 wherein said receiver is superheterodyne.

3. The detector of claim 1 wherein said power source of said vehicle comprises a cigarette lighter plug connected in circuit with a vehicle battery.

4. The detector of claim 1, further comprising:
   means for adjusting said receiver to a particular range of frequency emissions from said aircraft.

5. The detector of claim 1 wherein said antenna comprises two parallel conductor plates.

6. The detector of claim 5 wherein said conductor plates comprise the outside surfaces of said printed circuit boards.

7. The detector of claim 5 wherein said antenna further comprises a plurality of shorting bars connecting said plates.

8. The detector of claim 5 wherein said antenna comprises a waveguide antenna, a modified slot antenna and a transmission line radiator antenna.

9. The detector of claim 5 wherein said antenna comprises an omnidirectional scanner having full 360° sensitivity.

10. The detector of claim 5 wherein critical dimensions of said plates are maintained on an order of one-half wavelength of a frequency range of said aircraft frequency emissions.

11. The detector of claim 1 wherein said circuit board assembly further comprises a filter, said filter comprising a microstrip structure, said microstrip structure comprising a band-pass filter at signal frequencies and a band-stop filter at image frequencies, and means for providing to said filter gain and impedance matching of a signal appearing at said antenna.

12. The detector of claim 11 wherein said circuit board assembly further comprises means for tuning said filter.

13. The detector of claim 11 wherein said means for providing gain and impedance matching comprises the positioning of surface mounted capacitors on said surface of said second printed circuit board, said positioning of said capacitors independently determining input and output impedances.

14. The detector of claim 1 wherein said circuit board assembly further comprises a double conversion system circuit.

15. The detector of claim 1, wherein said circuit board assembly further comprises a single conversion system circuit.

16. A passive aircraft proximity detector of ruse in a highway vehicle to detect aircraft, said detector comprising:
   a circuit board assembly, said assembly comprising two printed circuit boards;
   a superheterodyne receiver secured to a surface of a first of said printed circuit boards;
   signal processor means secured to a surface of a second of said printed circuit boards;
   an antenna self-contained and integral with said circuit board assembly for receiving existing frequencies emitted from aircraft, said signal processor means detecting an amplitude of said frequencies;
   means for electrically connecting said detector to a power source of said vehicle; and
   means in circuit relationship with said circuit board assembly for indicating that an aircraft has been detected based on said amplitude.

17. The detector of claim 16, further comprising:
   means associated with said circuit board assembly to read out the approximate range of an aircraft from said vehicle based on said amplitude.

18. The detector of claim 16 wherein said means for indicating comprises an audio alarm, said alarm activated when said amplitude exceeds a predetermined level.

19. The detector of claim 17, further comprising:
means for manually adjusting a detection range.

20. The detector of claim 16 wherein said power source is a 12 volt DC source.

21. A aircraft proximity detector for use in a highway vehicle, comprising:
a compact case assembly, said assembly comprising a frequency receiver operating within a frequency range of 900 to 1300 megahertz to passively detect existing frequency emissions from aircraft within the detection range of said receiver, antenna means associated with said receiver, signal conversion circuit means for processing the frequency signal appearing at said antenna means and detecting an amplitude of said frequency signal, means associated with said signal conversion circuit means for alerting an occupant of said vehicle that an aircraft has been detected based on said amplitude, and means for electrically connecting said assembly to a power source of said vehicle.

22. The detector of claim 21 wherein said antenna means comprises a plate adjacent said receiver.

23. The detector of claim 21 wherein said antenna means comprises two parallel conductor plates.

24. The detector of claim 21 wherein said means for alerting an occupant of said vehicle comprises means for reading out an approximate distance of said aircraft from said vehicle based on said amplitude.

25. The detector of claim 21 wherein said means for alerting an occupant of said vehicle comprises an audio alarm, said alarm activated when said amplitude exceeds a predetermined level.

26. The detector of claim 25, further comprising:
means to deactivate said audio alarm without deactivating said detector.

27. The detector of claim 21, further comprising:
means for manually adjusting a detection range.

28. The detector of claim 21 wherein said detector is powered by a 12 volt DC source.

29. The detector of claim 21 wherein said signal conversion circuit means comprises a microstrip structure.

30. The detector of claim 21, further comprising:
a harmonically related local oscillator system operatively interconnected to said receiver.

* * * * *